April 12, 1949.  W. A. V. THOMSEN  2,466,750
CONTROL DEVICE
Filed Sept. 13, 1947  3 Sheets-Sheet 2
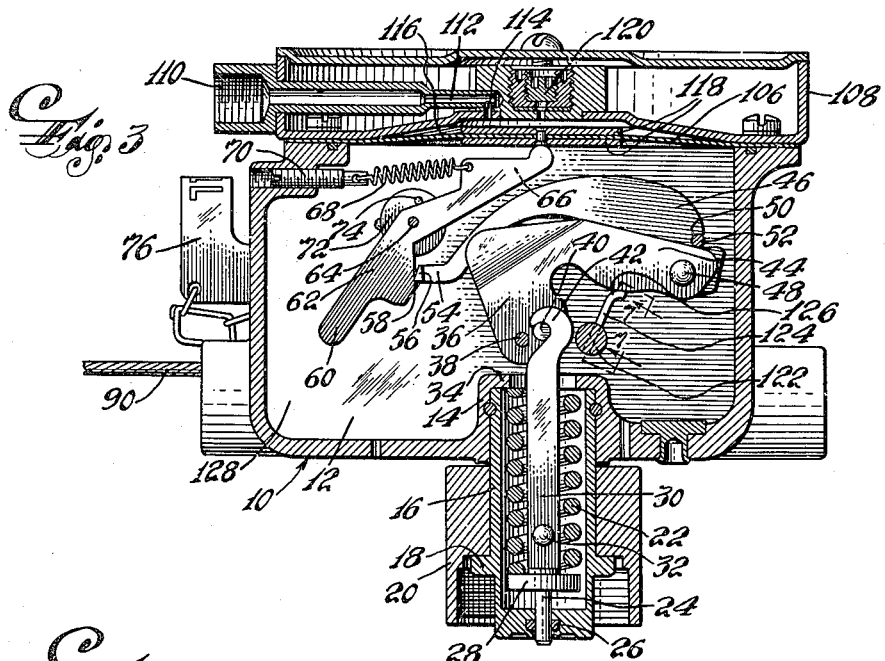
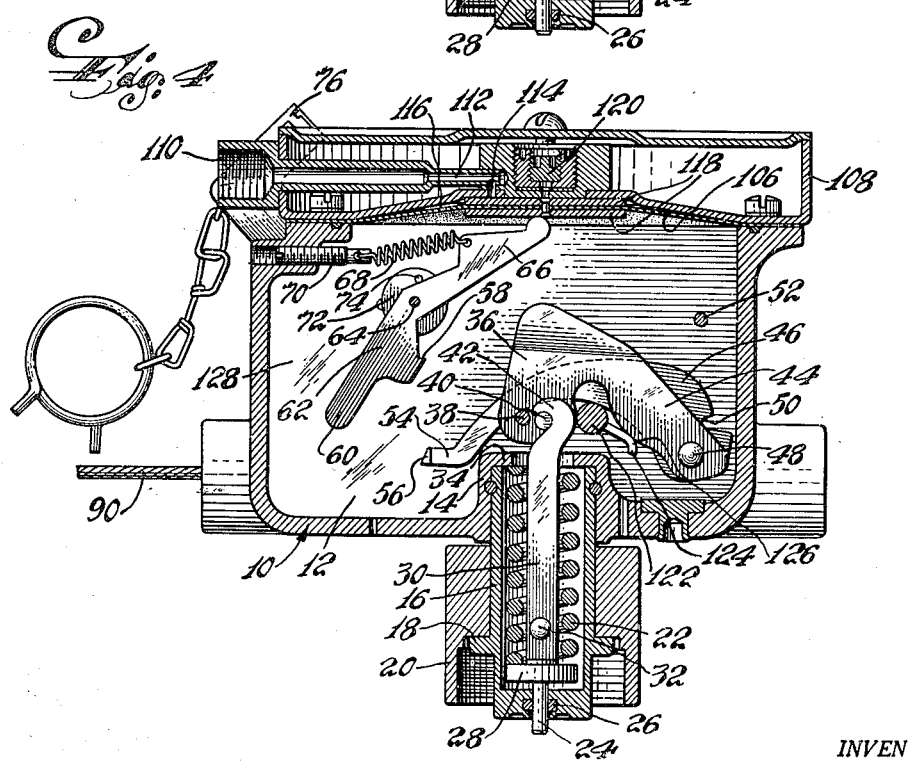
INVENTOR.
WILLIAM A. V. THOMSEN
BY
*Joseph Montgomery*
ATTORNEY

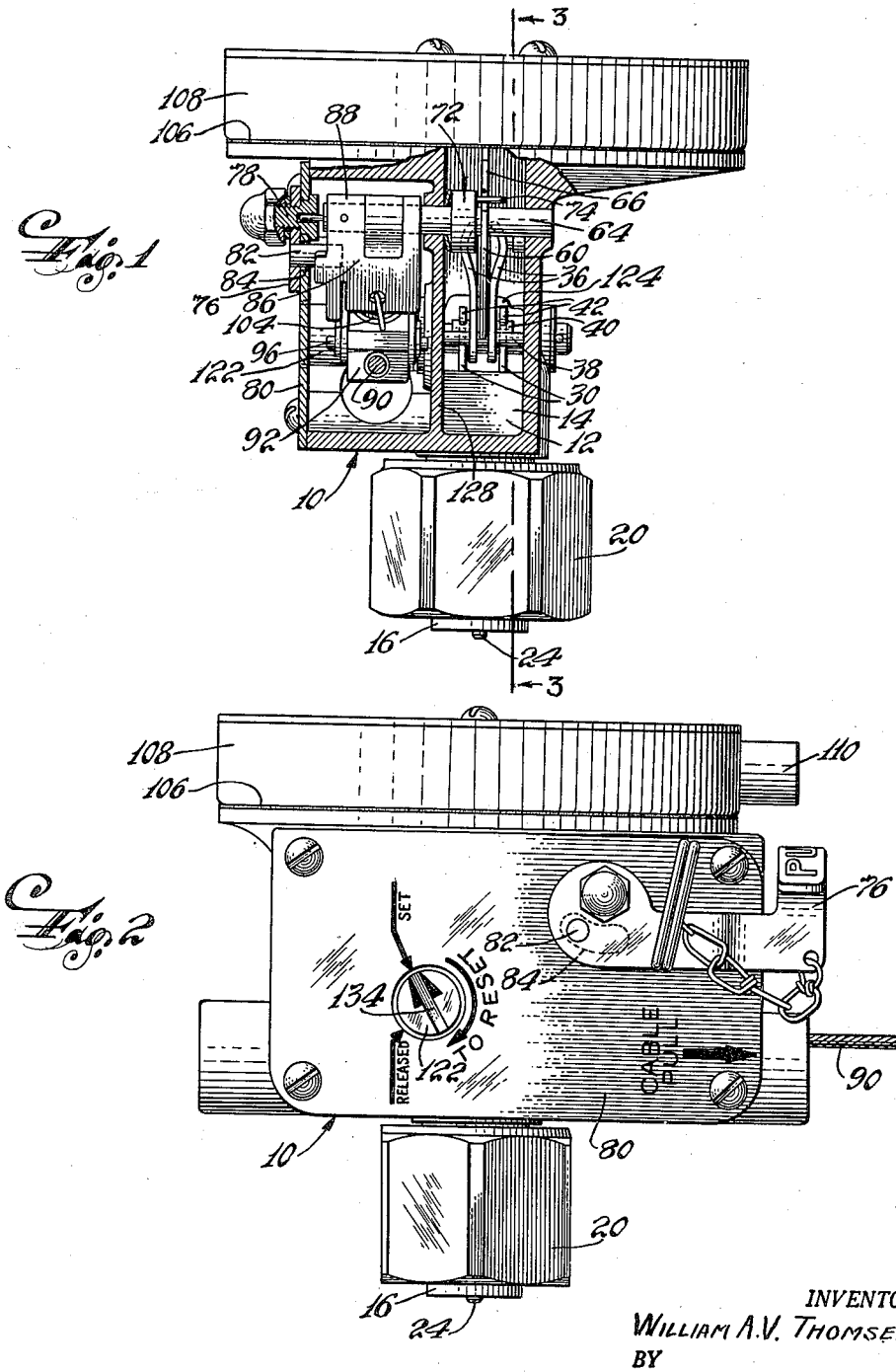

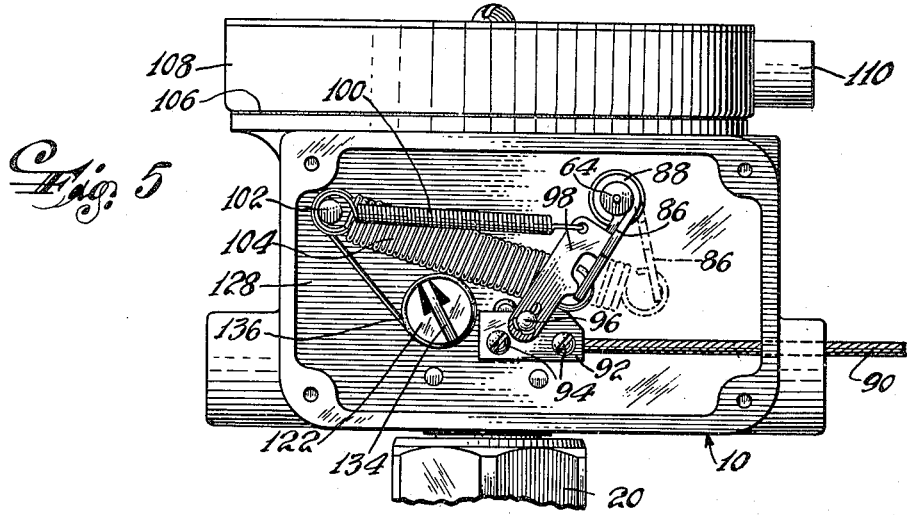
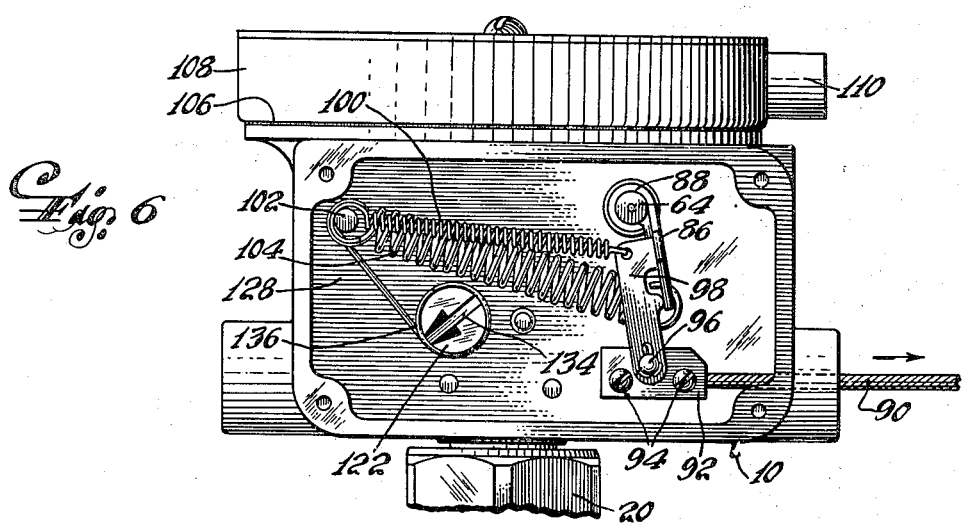
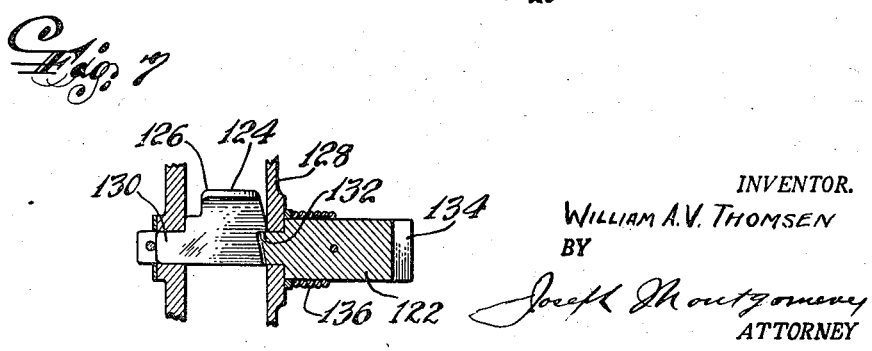
INVENTOR.
WILLIAM A. V. THOMSEN
BY
Joseph Montgomery
ATTORNEY Patented Apr. 12, 1949

2,466,750

UNITED STATES PATENT OFFICE 2,466,750

CONTROL DEVICE

William A. V. Thomsen, Glen Ridge, N. J., assignor to Specialties Development Corporation, Belleville, N. J., a corporation of New Jersey Application September 13, 1947, Serial No. 773,868

12 Claims. (Cl. 74—2)

The present invention relates to improvements in control devices, and is particularly directed to a control device adapted to be actuated by the application of a relatively slight force to operate the valves of systems for dispensing or discharging a medium stored under high pressure.

More specifically the present invention is directed to an improved control device of the type disclosed in U. S. Patent 2,333,130, and is adapted for use in connection with systems for releasing a fluid pressure medium, such as carbon dioxide, for extinguishing fires, inflating flotation bags, life rafts or the like, or operating various pressure actuated mechanism. The device of the present invention is particularly adapted to control the operation of the valves of such systems.

An object of the present invention is to provide a control device adapted to be actuated by a relatively slight force.

Another object of the invention is to provide a control device adapted to be operated by air pressure supplied by an explosive force or by a pressure medium, or by mechanical actuating means.

Another object is to provide a control device adapted to be actuated locally or from a remote location.

Another object is to provide a control device which is positive and effective in operation, is constructed of a minimum number of parts, and can be economically manufactured and assembled.

Another object is to provide a control device which is sturdy in construction and requires a minimum amount of maintenance and repair.

Another object is to provide a control device of the spring stored energy type which is readily reset.

A further object is to provide a control device wherein the resetting and indication of operation are accomplished by a novel means.

Other and further objects, not specifically enumerated above, will be apparent when described in greater detail in connection with the accompanying drawings, wherein:

Fig. 1 is an elevational view of a control device, partly in section, illustrating an embodiment of the present invention.

Fig. 2 is a side elevational view thereof looking to the right of Fig. 1.

Fig. 3 is a sectional view taken substantially along the line 3—3 on Figure 1.

Fig. 4 is a view similar to Fig. 3 showing parts of the device after operation.

Fig. 5 is a side view with the cover plate removed.

Fig. 6 is a view similar to Fig. 5 showing parts of the device after operation; and Fig. 7 is a sectional view taken on line 7—7 of Fig. 3.

Referring to the drawings in detail, and first to the illustration in Fig. 3, wherein there is shown a control device comprising a casing or housing 10 having a chamber 12 therein for housing the operating parts of the device which will be described hereafter. The interior lower portion of the casing is provided with a tubular portion 14 in which is secured a substantially cylindrical tubular sleeve 16 having an outwardly extending flange 18 adjacent its lower end, adapted to carry a coupling nut 20 for attaching the device to a valve in a pressure medium dispensing or discharging system (not shown).

The sleeve 16 provides a chamber for a cylindrical helical spring 22 adapted to store energy which may be utilized to move a plunger 24 which in turn may control the opening of a valve. The plunger 24 is slidably supported in the lower end wall of the sleeve having a packing or sealing member 26 extending about the shank of the plunger. The upper portion of the plunger has an outwardly extending flange 28 supporting a pair of link members 30 telescoped through the spring 22 and having their lower ends attached to the plunger by a rivet 32 or the like. The spring 22 is adapted to be compressed by moving the link members 30 upwardly, whereby the flange 28 engages the lower end of the spring and causes the upper end of the spring to be forced against an inwardly extending flange 34 at the upper end of the sleeve 16. The link members are held in their upper position to load the spring by a latch and lever system about to be described.

The latch and lever system, illustrated herein, may comprise a pair of levers 36 arranged side by side, each lever being pivoted on a pin or rod 38 suitably journalled in the casing 10. A suitable pin or rivet 40 extends through the levers 36, adjacent the pin 38, and the respective free ends of the pin or rivet 40 are each adapted to pivotally support one of the spring compressing link members 30 (Figs. 1 and 3). To facilitate assembly, the upper ends of the link members may be provided with a hook shaped portion 42 for engaging the pin 40.

The levers 36 each have an arm 44 between which a latching lever 46 is positioned. The lever 46 is pivotally connected adjacent the free end of each arm 44 by a suitable pin or rivet 48, providing a floating pivot for the lever and arms. The latching lever 46 is provided with a notch or recess 50, adjacent the pivot pin 48, for receiving a pin 52, mounted in the casing, for holding the levers 36 and 46 in latched position.

The lever 46 is provided with a relatively long arm 54 adapted to be tripped by a slight force to permit the lever 46 to pivot and cause the notch or recess 50 to move away from the pin 52, whereby the levers 36, the latching lever 46 and the link members 30 will be free to move under the action of the spring 22 to their respective positions, as shown in Fig. 4, to permit the plunger 24 to operate the valve. Preferably, the free end of the arm 54 has a lug or ear 56 (Fig. 3) for engaging a notch 58 provided in the arm 60 of a trigger lever 62 which is freely mounted on a reduced portion of a shaft 64 (Fig. 3) supported in the casing 10. The lever 62 has an arm 66 to which one end of a spring 68, or the like, is attached and the other end of the spring is connected to a tension adjusting screw 70 threaded in the casing. The spring 68 is normally slightly tensioned to maintain the arm 66 in a position so that the notch 58 of the trigger lever engages the lug or ear 56 on the arm of the latching lever. When the arm 66 is moved in opposition to the spring 68 the latching lever 46 is released.

The shaft 64 has a hub 72 keyed thereto (Figs. 1 and 3) which hub is provided with a laterally projecting pin 74 adapted to engage the trigger lever 62 and move the same about its pivot in the manner to be described presently.

The trigger lever may be oscillated or rotated in opposition to the spring 68 to release or trip the latching lever 46 by local mechanical means, remote mechanical means, or pneumatic means, each of which is about to be described.

An operating lever 76 (Figs. 1 and 2) is provided for local manual operation. This lever is freely mounted on a stub shaft 78 in a cover plate 80 for the device, and has a pin 82 projecting, through an arcuate slot 84 in the cover plate, into the chamber 12. An arm or plate 86, having one end 88 curved about and keyed to the shaft 64 and its other end free, is provided within the chamber 12 with its free end in alignment with the pin 82 of the operating lever 76. When the operating lever 76 is rotated on its pivot, in a clockwise direction, as viewed in Fig. 3, the pin 82 will engage the arm or plate 86 and thereby cause the shaft 64, and the hub 72 keyed thereto, to rotate whereby the pin 74 on the hub will engage and in turn rotate the trigger lever 62 in a clockwise direction, as viewed in Fig. 3, to trip or release the latching lever.

A pull cable operating device is provided for remote operation. This device comprises a pull cable 90, one end of which is at a remote location and its other end within the chamber 12. The end within the chamber extends into a block 92 in which the cable is securely clamped by screws 94. The block has a transverse bore for a pin or rod 96 which extends through the end of an arm 98 whereby to support the block. The arm 98 is freely mounted on the shaft 64 and has a nose piece adapted to engage the arm 86, so that when the cable 90 is pulled, to the right as viewed in Fig. 5, the arm 98 will engage and rotate the arm 86 which in turn will rotate the shaft 64 and effect the release of the latching lever in the manner previously described.

The arm 98 has a light spring 100 for retaining the arm in normal position and overcoming friction when the arm 86 is moved by operation of the lever 76. One end of this spring is secured to the arm and the other end to a stud 102 on the housing. The arm 86 has a heavier spring 104, one end of which is secured to the arm and the other end to the stud 102, for returning the arms 86 and 98 as well as the pull cable to their respective normal positions.

A pneumatic device is provided for operating the control. This device comprises a diaphragm 106 (Figs. 3 and 4) positioned at the top of the casing 10 and held in position by a cover 108 for the casing. An inlet coupling 110 is attached to or integral with the cover for introducing a blast of air or other suitable pressure medium which is conducted by apertures 112 and 114 to a recess 116 in the cover above the diaphragm, and is adapted to move the diaphragm downwardly to engage and move the arm 66 of the lever 62 to release the latching lever 46. If desired, the central portion of the diaphragm may be provided with a pair of reinforcing discs 118 suitably secured thereto. A relief or bleed device 120 is provided for venting pressure in the recess 116.

One of the features of the control device of the present invention is the provision of novel means, shown in detail in Fig. 7, for indicating when the device has been operated and for resetting the device.

The indicating and resetting means comprise a shaft 122 having a paddle or plate 124 secured therein, one end of which is curved to provide a cam surface 126 adapted to engage the lower edges of the arms 44, which have arcuate cam engaging edges. The shaft 122 is rotatably mounted, one end in a partition 128 and its other end in a wall of the housing. The paddle or plate 124 has a projecting portion 130 at one end fitting in the shaft bearing in the wall and and a shoulder portion 132 at its other end engaging in the shaft, whereby the same is suitably supported in the shaft. The shaft 122 extends to the outside face of the cover plate 80 and is provided with a screwdriver slot 134 in its outer face. A light spring 136 is wound about the shaft 122 having one end anchored in an aperture in the shaft and its other end held by the stud 102 (Figs. 5 and 6). This spring normally retains the shaft and paddle in normal position as shown in Fig. 3. When the latching lever is tripped in the manner hereinbefore described and the arms 44 are moved under the action of the spring 22 the cam action between the cam surface of the paddle and the arms 44 will cause the paddle and its shaft to rotate in a clockwise direction, as viewed in Fig. 3, against the action of the light spring 136.

When the device is operated by any of the operating means hereinbefore described to effect releasing of the trigger and latch levers, the shaft 122 will be rotated in the manner described so that the direction of the screwdriver slot will be changed from indicating the "set" position to indicating the "released" position (Fig. 2). In order to reset the device it is merely necessary to place a screwdriver in the slot 134 and rotate the shaft 122 in a counterclockwise direction, as viewed in Fig. 3, or clockwise direction, as viewed in Fig. 2, to bring the cam surface of the paddle into engagement with the lower edges of the arms 44. Continued rotation of the shaft 122 will cause the levers 36 and the latching lever to be carried upwardly in opposition to the spring 22, and enable the pin 52 to be re-engaged by the notch 50 of the latch lever 46. As this occurs the lug 56 on the arm 54 of the lever 46 re-engages the notch 58 of the trigger lever 62, whereby the levers are reset.

The end plate 80 may be provided with legends indicating the "Set" and "Released" positions and a legend indicating the direction of rotation of the shaft 122 necessary "To reset" the device.

From the foregoing description it will be seen that the present invention provides a control device which is readily actuated by locally or remotely controlled means. The device is provided with means which serve to indicate when the device has been actuated and, at the same time, may be utilized to reset the device. The resetting means are readily operable and a minimum amount of manual effort is required to reset the operating spring, and the latch and lever system. The parts of the device are rugged in construction and can readily withstand any rough usage to which they may be subjected.

While my invention resides in certain principles of construction and operation, a preferred embodiment of which is illustrated and described herein, it is to be understood that I do not wish to be limited to that embodiment, as obviously various changes and modifications may be made therein without departing from the spirit and scope of the invention.

I claim:

1. In a device of the class described, the combination of a housing, a spring, spring compressing means including a lever for operating said means, a latching lever operatively associated with said first lever, means for latching said latching lever to maintain said first lever in a spring compressing position, means for rendering said latching means ineffective, and a rotary member pivoted in said housing for moving said latching lever into latched position.

2. In a device of the class described, the combination of a housing, a spring, spring compressing means including a lever for operating said means, a latching lever operatively associated with said first lever, means for latching said latching lever to maintain said first lever in a spring compressing position, means for rendering said latching means ineffective, and a rotary member pivoted in said housing for moving said latching lever into latched position, said rotary member having means at the exterior of the housing cooperating with indicia on the housing for indicating the position of the rotary member.

3. In a device of the class described, the combination of a spring; spring compressing means including a member for operating said means; a latching member operatively associated with said first member; latching means for maintaining said latching member in a position whereby said first member is adapted to maintain said means in a spring compressing position; means for rendering said latching means ineffective; and cam means, conditioned upon rendering of the latching means ineffective, for moving said latching member into latched position.

4. In a device of the class described, the combination of a spring; spring compressing means including a member for operating said means; a latching member operatively connected to said first member; latching means for maintaining said latching member in a position whereby said first member is adapted to maintain said means in a spring compressing position; means for rendering said latching means ineffective; and a paddle member adapted to contact the first member, and movable by the first member, when the latching means is rendered ineffective, whereby to condition the paddle member for restoring said latching member to latched position.

5. In a device of the class described, the combination of a spring; spring compressing means including a member for operating said means; a latching member operatively connected to said first member; latching means for maintaining said latching member in a position whereby said first member is adapted to maintain said means in a spring compressing position; means for rendering said latching means ineffective; a shaft; a resetting member carried by said shaft adapted for engagement with the first member; said resetting member being movable by the first member upon rendering the latching means ineffective, whereby to condition the resetting member for restoring said latching member to latched position; said shaft having means for indicating the position of the resetting member.

6. In a device of the class described, the combination of a spring; spring compressing means including a pivotally mounted lever for operating said means; a latching lever operatively connected to said first lever; trigger means for latching said latching lever to maintain said first lever in a spring compressing position; a shaft for said trigger means; an arm keyed to said shaft; and manually operable means for moving said arm, whereby to effect rotation of said shaft and trigger means to render the latching means ineffective.

7. In a device of the class described, the combination of a spring; spring compressing means including a pivotally mounted lever for operating said means; a latching lever pivotally connected to said first lever; trigger means for latching said latching lever to maintain said first lever in a spring compressing position; a shaft for said trigger means; an arm keyed to said shaft; and a manually operable lever having means in the path of said arm for effecting rotation of said shaft and trigger means whereby to render the latching means ineffective.

8. In a device of the class described, the combination of a spring; spring compressing means including a pivotally mounted lever for operating said means; a latching lever pivotally connected to said first lever; trigger means for latching said latching lever to maintain said first lever in a spring compressing position; adjustable resilient means retaining said trigger means in latching position; a shaft for said trigger means; an arm keyed to said shaft; and a manually operable member for moving said arm to effect rotation of said shaft and trigger means against the action of said resilient means, whereby to render the latching means ineffective.

9. In a device of the class described, the combination of a spring; spring compressing means including a pivotally mounted lever for operating said means; a latching lever; a pivot for pivotally connecting said levers; trigger means for latching said latching lever to maintain said first lever in a spring compressing position; a shaft for said trigger means; an arm keyed to said shaft; a manually operable member for moving said arm whereby to effect rotation of said shaft and trigger means to render the latching means ineffective; and means conditioned upon movement of said arm for returning the arm to its normal position.

10. In a device of the class described, the combination of a spring; spring compressing means including a pivotally mounted lever for operating said means; a latching lever; a pivot for pivotally connecting said levers; trigger means for latching said latching lever to maintain said first lever in a spring compressing position; a shaft for said trigger means; a plate keyed to said shaft; an arm pivotally mounted on said shaft adapted to engage said plate; a cable having one end secured to the free end of said arm, whereby when the cable is moved in one direction the arm will effect movement of said plate, shaft and trigger means to render the latching means ineffective; and means for restoring said plate, shaft and cable to their respective normal positions.

11. In a device of the class described, the combination of a spring; spring compressing means including a pivotally mounted lever for operating said means; a latching lever; a pivot for pivotally connecting said levers; trigger means for latching said latching lever to maintain said lever in a spring compressing position; a shaft for said trigger means, a plate keyed to said shaft; an arm pivotally mounted on said shaft adapted to engage said plate; a cable having one end secured to the free end of said arm whereby when the cable is moved in one direction the arm will effect movement of said plate, shaft and trigger means to render the latching means ineffective; means conditioned upon said movement of the cable for restoring the plate, shaft and cable to their respective normal positions; and means conditioned when said latching means is rendered ineffective for restoring said latching lever to latched position.

12. In a device of the class described, the combination of a casing; a spring; spring compressing means including a pivotally mounted lever for operating said means; a latching lever operatively connected to said first lever; trigger means for latching said latching lever to maintain said first lever in a spring compressing position; a shaft for said trigger means; adjustable resilient means maintaining said trigger means in latching position; a cable; an arm pivotally mounted on said shaft; clamping means carried by the free end of said arm for the end of the cable, whereby when the cable is moved in one direction the arm will effect movement of the trigger means against the action of said resilient means to render the latching means ineffective; a manually operable member pivotally mounted on said casing for moving said first means into spring compressing position and said latching lever into latched position, said casing having an aperture into which said manually operable member is adapted to project; and means on the projecting portion of said member to provide a visible indication of the condition of said latching lever.

WILLIAM A. V. THOMSEN.

No references cited.